Oct. 8, 1968     R. L. DREYFUS     3,404,508

PACKAGING

Original Filed July 24, 1961     2 Sheets-Sheet 1

Oct. 8, 1968  R. L. DREYFUS  3,404,508

PACKAGING

Original Filed July 24, 1961  2 Sheets-Sheet 2

United States Patent Office 3,404,508
Patented Oct. 8, 1968

3,404,508
PACKAGING
Robert L. Dreyfus, Arlington, Mass., assignor to W. R. Grace & Co., Cambridge, Mass., a corporation of Connecticut
Application July 24, 1961, Ser. No. 126,202, now Patent No. 3,215,266, dated Nov. 2, 1965, which is a continuation-in-part of application Ser. No. 772,471, Nov. 7, 1958. Divided and this application Sept. 15, 1965, Ser. No. 527,999
2 Claims. (Cl. 53—34)

ABSTRACT OF THE DISCLOSURE

A method of covering an object by placing the object on a heat-shrinkable film, bringing the edges of the film over the top of said object, and heating the edges to shrink them and form a thickened edge on the film.

This invention relates to packaging and more particularly, to the packaging of one or more articles within a sheet of heat-shrinkable, thermoplastic material.

This application is a division of my prior copending application Ser. No. 126,202, filed July 24, 1961, now U.S. Patent 3,215,266 dated Nov. 2, 1965, which was a continuation-in-part of my application Ser. No. 772,471, filed Nov. 7, 1958, now U.S. Patent 3,060,655 dated Oct. 30, 1962.

It is an object of the present invention to provide a novel and simple method of enclosing an object within a sheet of heat-shrinkable, thermoplastic material.

An additional object is to partially encapsulate objects using heat-shrinkable plastic material.

A further object is to package together a plurality of objects using a heat-shrinkable, thermoplastic film sheet.

It is also an object to package together a plurality of objects without the use of supports or trays of any kind.

It is also an object of the present invention to package together a plurality of objects utilizing the heat-shrinking properties of the thermoplastic wrapping material to hold the wrapping material in place about the objects.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Referring to the drawings.

In the present invention, a single object or a plurality of objects are packaged using a heat-shrinkable, thermoplastic film as the sole packaging material. Suitable heat-shrinkable polymeric film materials, as are well-known to those skilled in the art, include, but are not limited to, such materials as heat-shrinkable polyolefins, e.g., polypropylene, polyvinyl compounds, e.g., polyvinyl chloride and sarans, polyesters, e.g., polyethylene terephthalate.

The heat-shrinkable plastic material is employed in the form of relatively thin sheets, i.e., from 0.5 mil to 3 mils in thickness, which sheets may be transparent, translucent, colored, printed, etc., as desired.

Heat-shrinking properties are produced in some thermoplastic polymeric materials by heating the solid polymer to an elevated temperature, stretching the heated polymer thereby stretching and orienting the molecules in the polymer, cooling the polymer while under this stretching tension to a temperature at which the polymer will retain its stretched or oriented state when tension is released. In effect, the molecules in the polymer are aligned and stretched in the direction or directions in which they are drawn and "frozen" in this new position. The subsequent application of heat to the polymeric material "thaws" the polymer and permits the polymer molecules to return to their original pre-oriented position or state.

In the specific examples below, there is employed as the heat-shrinkable film, irradiated, biaxially oriented polyethylene, prepared from Alathon 14 which is a polyethylene having an average molecular weight of 20,000 and a density of 0.916. The polyethylene is irradiated to an extent of about 12 megarad and then biaxially stretched 350 percent longitudinally and 350 percent laterally. The thus irradiated and stretched polyethylene has a shrink energy of about 150 pounds per square inch in both directions at 96° C. and has a tensile strength of at least 5,000 pounds per square inch at 21° C. The high tensile strength and high shrink energy make this film particularly suitable for use in the present invention.

Figure 1:
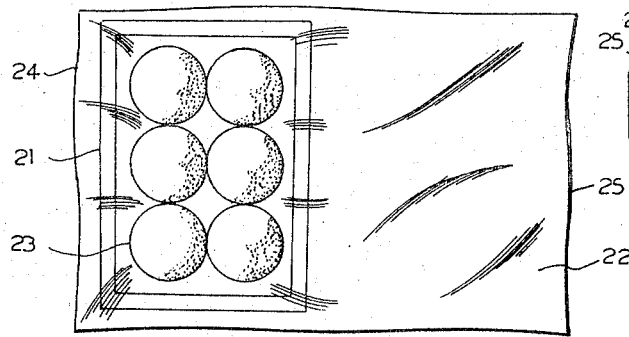
FIGURE 1 is a plan view showing a preliminary step in the packaging of a plurality of objects which are somewhat spherical in shape.
Figure 2:
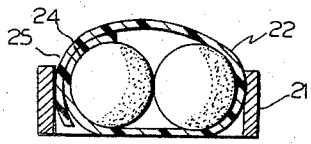
FIGURE 2 is a sectional view showing a later step in the formation of the same package.
Figure 3:
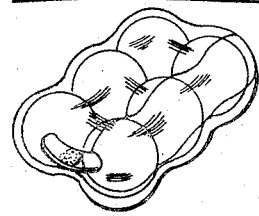
FIGURE 3 is a perspective view showing the completed package.

Referring more specifically to FIGURES 1, 2, and 3 of the drawings, there is provided a fixture 21 which serves merely as an aid in the formation of the package of the present invention. The fixture is a rectangular frame open at top and bottom which is sufficiently large to encompass the objects being packaged.

A sheet 22 of the irradiated, oriented polyethylene film, 1.0 mil thick, is placed over the fixture as shown in FIGURE 1. Six, roughly spherical objects 23, e.g., oranges, are placed in the fixture over that portion of the film sheet within the fixture. One end 24 of the film sheet is folded up against the side and over the top of the objects. The opposite end 25 is subsequently drawn over the top of the objects, overlapping the first fold and is then drawn down against the side of the objects. The film end 25 is held between the fixture and the objects 23 as is shown in FIGURE 2. The objects are now enclosed within a sheet of shrinkable film, two longitudinal ends of which are overlapped so as to form a somewhat loose tube which is open at both ends. The overlapped edges preferably extend over the convex surfaces of the enclosed objects as shown in FIGURES 2 and 3. The fixture, containing the objects enclosed within the tube of film, is passed through a hot air oven, the temperature of which is high enough to shrink the particular film employed. In the present example, an air temperature of 500° F. was employed. Surprisingly, the overlapped longitudinal film edge in shrinking does not slide over the underlying film causing the tube to come apart but rather the overlapped film edge shrinks against and becomes locked to the underlying film at points where the edges overlap and bear against the enclosed objects. The heat required to shrink the film combined with the tension exerted by the shrinking film is sufficient to provide a positive heat seal. The open ends of the tube shrink back against the object, gripping the objects but leaving a small oval opening, the film edges of which are somewhat thickened. The completed package with the fixture removed is shown in FIGURE 3.

The above package is particularly suitable for horticultural items because of the opening at either end which permits circulation of air through the package. It is also possible to package non-horticultural items in the above package.

The above package is formed without the fiber or pulp tray commonly used in packaging fruits, vegetables, etc. This in itself is a tremendous advantage in that it eliminates the cost of the tray, results in a package that is formed from a single material, requires no adhesives, clips or any other additional fastening means and provides a package wherein the product is completely visible from all sides. Another unexpected advantage is that the above package withstands the abuses of handling and shipping to a much greater extent than does the conventional, pulp tray-film overwrap, type of package. In addition, in my package there is no problem of fitting the objects to the package which problem does exist when trays are a necessary part of the package.

It is possible to obtain a strong, fairly rigid package without the necessity of a tray or some other reinforcing means because the film shrinks about the enclosed objects tightly and does not relax this tightness and thereby holds the objects together in a fixed or stable position.

Figure 4:
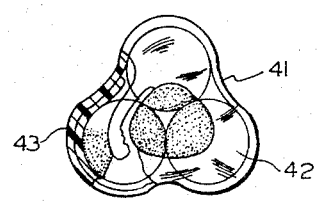
FIGURE 4 is an elevational view, partially in section, of a modified form of the package shown in FIGURE 3.

It is not necessary that the objects all lie in a single plane as in FIGURE 3 but the objects may be stacked in layers. In FIGURE 4, for example, two of the objects are stacked upon a base of four objects. An oversized sheet of 1.5 mil irradiated, biaxially oriented polyethylene film 41 is drawn around the stacked spherical objects 42 so that one longitudinal edge overlaps the opposite longitudinal edge. It is desirable that the film edge overlap the underlying film by at least three inches and preferably by a distance at least equal to the diameter or thickness of the objects being enclosed. Preferably the overlapped film portions should overlay the convex portions of the spherical objects. The overlapped film edge may be held in place for passage through a hot air oven by causing the overlapped portion to be positioned beneath the objects. The weight of the objects will prevent the tube from opening. The film shrinks, as in the previous example, forming a tight, stable package in which the overlapped longitudinal edge 43 is heat sealed where tension has been brought to bear by the shrinking film. The heat seal does not extend along the entire longitudinal edge but occurs only where the overlap occurs across a convex surface so that the shrinking of the film presses the layers of the film tightly together.

As already indicated, the overlapped longitudinal edges of the film sheet should preferably overlay a convex or protruding portion or surface of the object or objects, so that when shrinking occurs, a mechanical cup-like locking of the overlapped film edges takes place. As the film shrinks, the overlapped film portions are forced into intimate contact over all convex or protruding surfaces, and a seal occurs in these areas due to the combined effects of heat and pressure.

It may be desirable to first shrink the open ends of the tube as this will function to lock the film tube about the enclosed objects and prevents the overlapped portions from blowing out of contact when exposed to the hot air. It has been found that in many cases when the product, enclosed within the tube, is run through a hot air oven or tunnel that the ends will tend to shrink first because there is no nearby material to absorb heat transmitted to the film. Therefore, what appears to be a simultaneous overall application of heat will still afford the desired result.

The objects that may be packaged in this manner include single objects, multiple objects, and multiple packages containing such objects. The objects are not limited to those having any particular shape, size or composition.

Figure 5:
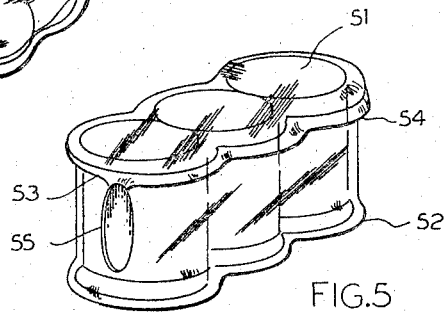
FIGURE 5 is a perspective view of a package enclosing a plurality of cylindrical objects.

A plurality of cylindrical containers may be advantageously packaged together in the manner of the present invention as is shown in FIGURE 5 of the drawings. Three cylindrical containers 51 are placed together in a straight row upon an oversized sheet of heat shrinkable film 52. The film is wrapped longitudinally about the containers by first bringing one longitudinal film edge 53 across the top and partially down the side of the containers and then bringing the opposite longitudinal film edge 54 over the top of the containers overlapping the first film edge and extending a short distance down the opposite side of the containers. The overlapped film edge 54 extends at least one-half inch down the side of the container. It is preferable that the overlapped film edges completely cover the tops of the containers. The open ends of the film wrapper extend at least two inches beyond either end of the row of containers. The open ends 55 of the film are first shrunk by directing hot air from a hot air gun at these ends, shrinking them back against the containers. By shrinking the ends first, this will serve to hold the overlapped film edge in place. The entire package is then subjected to hot air shrinking the heretofore unshrunk portions of the wrapping sheet and causing the overlapped edge to be heat-sealed to the underlying film sheet in those areas where the overlapped film layers bear against the enclosed containers and particularly in those areas where the overlapped film edges bear against a convex surface. The only purpose in pre-shrinking the ends is to prevent the overlapped edge from opening up prior to the main shrinking operation or to prevent the overlap from blowing away from contact with its mating or underlying film surface or shrinking out of contact with the underlying surface when exposed to a hot air blast. A slight mechanical pressure will also suffice to keep the overlap in place and in contact with the underlying surface. Sufficient pressure may be provided by resting the package on the overlapped portion during shrink; another method would be to place a light weight on top of the containers, e.g., a conveyor belt which rides on top of the overwrapped containers as they pass through a hot air tunnel.

Figure 6:
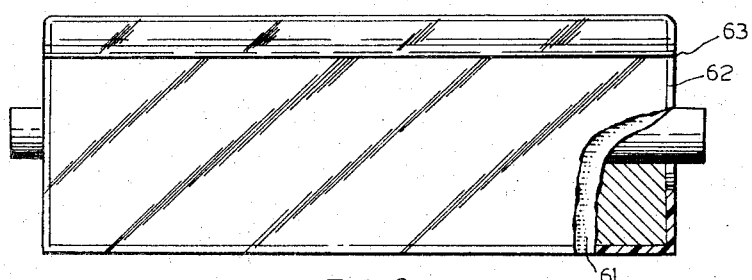
FIGURE 6 is an elevational view, partially in section, of a package enclosing a cylindrical object.

Partial encapsulation of a single cylindrical object, e.g., a roll of paper can be accomplished by placing the roll 61 upon an oversized sheet of shrinkable film 62, overlapping the longitudinal ends of the film and shrinking the protruding ends of the tube back against the roll. The remainder of the film is heat shunk producing a tight, wrinkle-free package in which the overlapped film edge 63 is held tightly against the underlying film surface, as shown in FIGURE 6.

Figure 12:
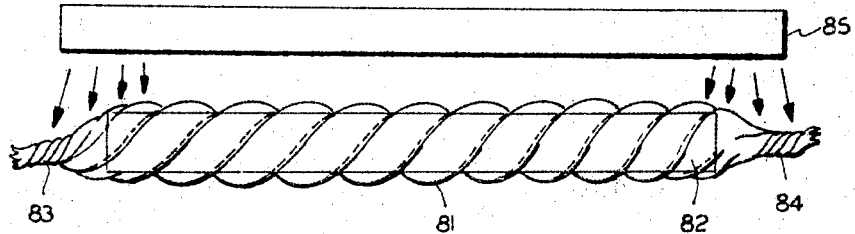
FIGURE 12 is a elevational view of a cylindrical container spirally wrapped with heat shrinking film.

Using a long, narrow strip of irradiated, high shrink energy polyethylene, it is possible to encapsulate objects as is shown in FIGURE 12. A sheet 81 of the polyethylene having a thickness of 1 mil is spirally wrapped around cylindrical container 82. Opposite ends 83 and 84 of the sheet are heated, e.g., with the aid of a radiant heater 85, and thus shrunk to secure the package. Then the remaining surfaces of the polyethylene sheet are heat-shrunk around the cylinder to complete the encapsulation procedure. The application of heat will partially seal the overlap.

Figure 7:
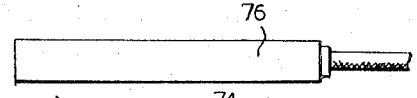
FIGURE 7 is a sectional view of an alternative method of forming a cover around a container.
Figure 8:
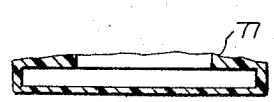
FIGURE 8 is a sectional view of the cover at the completion of the process in FIGURE 7.
Figure 9:
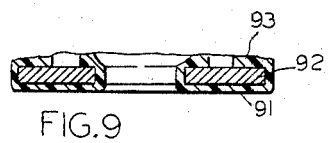
FIGURE 9 is a vertical section showing the partial encapsulation of a ring gasket.

The present invention is also adapted to placing a protective polyethylene film on lids or covers. This form of the invention is illustrated in FIGURES 7 and 8. Thus, a form or ring 71 for making a lid or cover is placed top side down on a piece of irradiated, high shrink energy, polyethylene film 72. The edges of the lid 71 and the corresponding area of the polyethylene film are restrained by means of ring 73. The free polyethylene film 74 on the back 75 of the lid is heated with hot air heater 76 to shrink and thicken the polyethylene at 77, as shown in FIGURE 8. The restraining ring acts to control the shrinkage, since shrinkage does not take place under it or beyond. In order to remove wrinkles from the polyethylene film, the front of the lid can be heated briefly as can the sides and the area under the ring. In similar fashion, the polyethylene film 91 can be shrunk around gasket 92 to form a thickened sealing area 93 at the back, as shown in FIGURE 9.

Figure 10:
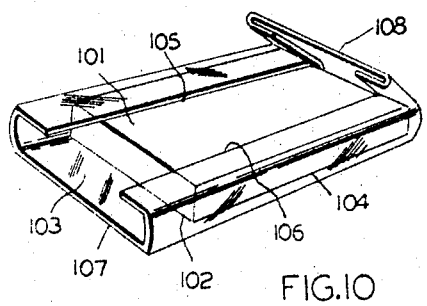
FIGURE 10 is a perspective view showing the formation of an overwrap.
Figure 11:
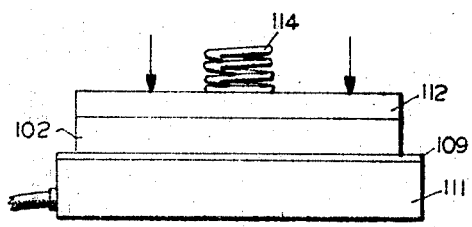
FIGURE 11 is a side elevational view showing the sealing of the overwrap of FIGURE 10.

The present invention can likewise be used to cover only one surface and the sides of a package, the back surface being sealed only at the four corners as is illustrated in FIGURES 10 and 11. As an illustration of this procedure, a box 5 inches by 8 inches by 1¼ inches was packaged using an irradiated, high shrink energy, polyethylene film 9½ inches wide by 12½ inches long. These dimensions were obtained by utilizing as the width, the box width plus two times the box height plus two inches, and as the length, the box length plus two times the box height plus two inches. The box 101, top side 102 down, was centered on the polyethylene film 103 with the long side 104 of the box parallel to the long side of the film. One opposite pair of film edges, e.g., the two long edges 105 and 106, were folded over the box. Then the second pair of film edges, namely the short edges 107 and 108, were folded over the box. At the four corners, these edges overlapped. The box 101 was then inverted on a Teflon (polytetrafluoroethylene) 109 covered hot plate 111. The hot plate was set at about 300 to 325° F. and weight 112, biased by spring 114, was pressed down firmly on the overlapping edges to heat the film uniformly. The film is sealed at the four corners and shrunk along the borders with a resultant increase in gauge and tightness. The film should be cooled while the film is still being restrained. Normal overwrapping, e.g., the diaper wrap, requires 14 inches by 14 inches (196 square inches) or more of polyethylene film. The present procedure thus results in a saving of 40 percent or better in material required.

Figure 13:
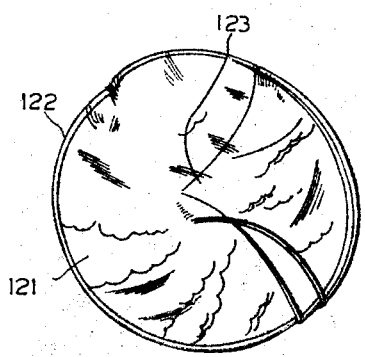
FIGURE 13 is a perspective view of an object packaged according to the present invention.

A modification of the above methods produces the package illustrated in FIGURE 13, wherein an object 111, e.g., a head of lettuce, is completely wrapped in a sheet of heat-shrinkable, irradiated polyethylene 112. The head of lettuce placed upon an oversized sheet of film and wrapped by the diaper wrap method, i.e., opposite diagonal corners of the film sheet are folded over the object. The folds 113 were made without tucking so that the package was quite loose. The package was placed on a flexible wire conveyor belt with the folds in contact with the belt so that the weight of the product would hold the fold from shrinking apart during the shrinking and sealing process. The product loosely wrapped is carried through a high-temperature, 800° F., 1000 feet per minute, hot air shrinking tunnel at a speed of 60 feet per minute. The folds 113 seal together during the shrinking operation, and the remainder of the film closely clings to the head of lettuce. This procedure eliminates the separate sealing operation for the overlapped film corners or any other sealing or securing step such as fastening with clips, glue, etc.

In general, there is employed as the wrapping material in this invention a polyethylene film which has been irradiated to an extent of 2 to 100 megarads, preferably 6 to 20 megarads. This irradiation can be accomplished in conventional fashion, e.g., by the use of an electron beam generator, such as the 2,000,000 volt General Electric resonant transformer unit or other high energy particle generators of from 50,000 to 50,000,000 volts or a Van de Graaff electron generator. In addition to the use of electrons, there may be employed beta rays, gamma rays, etc. There can be employed any of the irradiation procedures disclosed in Baird application, Ser. No. 713,848, filed Feb. 7, 1958, or in Rainer et al., United States Patent 2,877,500. The disclosures to the Rainer et al. patent and the Baird et al. application are hereby incorporated by reference.

The biaxial orientation is normally carried out to an extent of 100 percent to 700 percent longitudinally and 100 percent to 900 percent laterally. The biaxial stretching can be carried out by blowing irradiated polyethylene tubing as disclosed in the Baird application. The irradiated biaxially oriented polyethylene prepared by such a procedure has a high shrink energy, e.g., 100 to 500 pounds per square inch in each direction at 96° C. Shrink energy is defined as the force of contraction at a given temperature when the material is restrained, more specifically, it is the measurable tension produced in a fully mono-directionally restrained strip of film when heated to the specified temperature.

There can be employed as the starting polyethylene for the irradiation procedure high, low or medium density polyethylene prepared by high or low pressure techniques and having molecular weights of from 7000 to more than 35,000.

There may also be employed in place of polyethylene in the irradiation procedure, copolymers of ethylene and propylene, copolymers of ethylene with minor amounts of other monoolefins or butadiene and also blends of polyethylene with copolymers of ethylene and other monoolefins, e.g., polyethylene blended with from 25 percent to 90 percent by weight of a copolymer of ethylene copolymerized with from 0.5 percent to 15 percent by weight of an olefin having 3 to 18 carbon atoms.

Other heat-shrinkable film materials which may be employed include oriented polypropylene, polyvinyl chloride, and vinylidene chloride copolymers, etc.

I claim:
1. A method of covering an object comprising:
   (a) placing the object on a heat-shrinkable film;
   (b) bringing the edges of the film over the top of said object;
   (c) restraining the film at the top edges of the object;
   (d) heating the free portion of the film to shrink it back to said restrained portion and form a thickened edge on the film; and,
   (e) ceasing said restraining of the film at the top edges.
2. A method according to claim 1 wherein said object is a circular container.

References Cited
UNITED STATES PATENTS

| | | | |
|---|---|---|---|
| 2,754,959 | 7/1956 | McCarty | 206—45.33 |
| 3,034,271 | 5/1962 | Carpenter et al. | 53—184 |

WILLIAM W. DYER, Jr., *Primary Examiner.*

N. ABRAMS, *Assistant Examiner.*